(12) United States Patent
Manthe

(10) Patent No.: US 6,791,063 B2
(45) Date of Patent: Sep. 14, 2004

(54) WELDING-TYPE POWER SUPPLY WITH THERMAL MANAGEMENT

(75) Inventor: Alan Manthe, Hortonville, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/300,503

(22) Filed: Nov. 19, 2002

(65) Prior Publication Data

US 2004/0094528 A1 May 20, 2004

(51) Int. Cl.[7] .............................................. B23K 9/10
(52) U.S. Cl. ................................................ 219/130.21
(58) Field of Search ........................... 219/110, 130.21, 219/130.31, 130.32, 310.33; 323/320

(56) References Cited

U.S. PATENT DOCUMENTS

| | | | | |
|---|---|---|---|---|
| 4,447,700 A | * | 5/1984 | Cohen | 219/110 |
| 5,757,176 A | * | 5/1998 | Farrow | 323/320 |
| 6,359,566 B2 | * | 3/2002 | Kawai | 219/110 |
| 2002/0038795 A1 | * | 4/2002 | Katooka et al. | 219/130.21 |

OTHER PUBLICATIONS

Dynasty™ 300 DX Miller The Power of Blue Owner's Manual Jun. 2000.
Dynasty™ 300 SD, DX And LX Miller The Power of Blue Owner's Manual Oct. 2001.
Maxstar® 200 SD, DX, And LX Miller The Power of Blue Owner's Manual Oct. 2001.
Maxstar® 200 STR Miller The Power of Blue Owner's Manual Oct. 2001.
Maxstar® 300 DX Miller The Power of Blue Owner's Manual May 2000.
Maxstar® 300 SD, DX And LX Miller The Power of Blue Owner's Manual Oct. 2001.

* cited by examiner

Primary Examiner—Clifford C. Shaw
(74) Attorney, Agent, or Firm—George R. Corrigan

(57) ABSTRACT

A method and apparatus for providing welding-type power includes a power circuit, a temperature sense circuit, a switch feedback circuit, and a controller. They cooperate to provide thermal management based on a switch parameter, such as current, in addition to a sensed temperature.

37 Claims, 2 Drawing Sheets

WELDING-TYPE POWER SUPPLY WITH THERMAL MANAGEMENT

FIELD OF THE INVENTION

The present invention relates generally to the art of welding-type power supplies. More specifically, it relates to welding-type power supplies with thermal protection of switches.

BACKGROUND OF THE INVENTION

There is a wide variety of welding-type power supplies, many use switches to control power. For example, inverter-based power supplies use two or four switches that are pulse width modulated and invert a bus to provide ac regulated power. Many other topologies also use switches.

It is known in the prior art that power switches can overheat. For example, many switches are rated to have a maximum junction temperature of 150° C. Additionally, optimum use of the switch may occur when the temperature is below the maximum, for example at a junction temperature of 130° C. Thus, some welding-type power supplies have a thermal management scheme to prevent switch overheating.

Some welding-type power supplies with thermal management measure the temperature at the switch casing or on the heat sink, and compare that to a threshold. Because the temperature is at the heat sink or switch casing, the measured temperature is less than the actual junction temperature. Prior art thermal management schemes attempt to account for the difference by determining the maximum difference between actual and measured temperature (which occurs at maximum switch current). The difference between junction and switch casing temperature for the maximum current (or any given current) may be calculated using the thermal impedance (provided by the switch manufacturer) for a given switch power (Vsat at the given current multiplied by the given current). This difference, is then used to set a maximum sensed temperature, above which the machine output is reduced (to a lessor value or to zero), to protect the switches.

For example, if the maximum junction temperature is 130° C., and the determined difference at the maximum machine current is 40° C., then the threshold is set to 90° C. for all currents. While this adequately protects the switches it overestimates the difference between the junction temperature and the sensed temperature at less than the machine maximum current. The output will be reduced or folded back even if the junction temperature is below the optimal temperature.

Accordingly, a welding-type power supply with thermal management that more closely uses the optimal temperature across a wider operating range is desired.

SUMMARY OF THE PRESENT INVENTION

According to a first aspect of the invention a welding-type power supply includes a power circuit, a temperature sense circuit, a switch feedback circuit, and a controller. The power circuit has at least one switch, and the switch has a control input. The temperature sense circuit is disposed to sense a temperature produced by the switch, and has an output indicative of the sensed temperature. The switch feedback circuit senses at least one operating parameter of the switch, and provides an output responsive to the switch parameter. The controller includes a temperature circuit that provides a control output to the switch in response to the switch feedback output and the temperature feedback.

According to a second aspect of the invention a method of providing welding-type power includes controlling a power circuit. The power circuit has one or more switches with control inputs. A temperature produced by the switch or switches is sensed, as is at least one switch operating parameter. The output of the power circuit is reduced if the sensed temperature exceeds a corrected threshold. The corrected threshold is responsive to the operating parameter.

The operating parameter of the switch (or switches) includes current or a function thereof, voltage or a function thereof, or a combination thereof, in various embodiments.

The welding-type power supply includes a look-up table that has the operating parameter as an index, and temperature adjust values and/or corrected threshold values stored as data associated with the index, in one embodiment.

The welding-type power supply includes a calculation circuit that calculates a temperature adjust value from the switch parameter, in another embodiment.

The stored data and/or the calculated values include temperature corrections based on switch current and switch voltage in another embodiment.

The welding-type power supply includes a thermal resistor to provide the temperature feedback in one alternative.

Other principal features and advantages of the invention will become apparent to those skilled in the art upon review of the following drawings, the detailed description and the appended claims.

Figure 1:
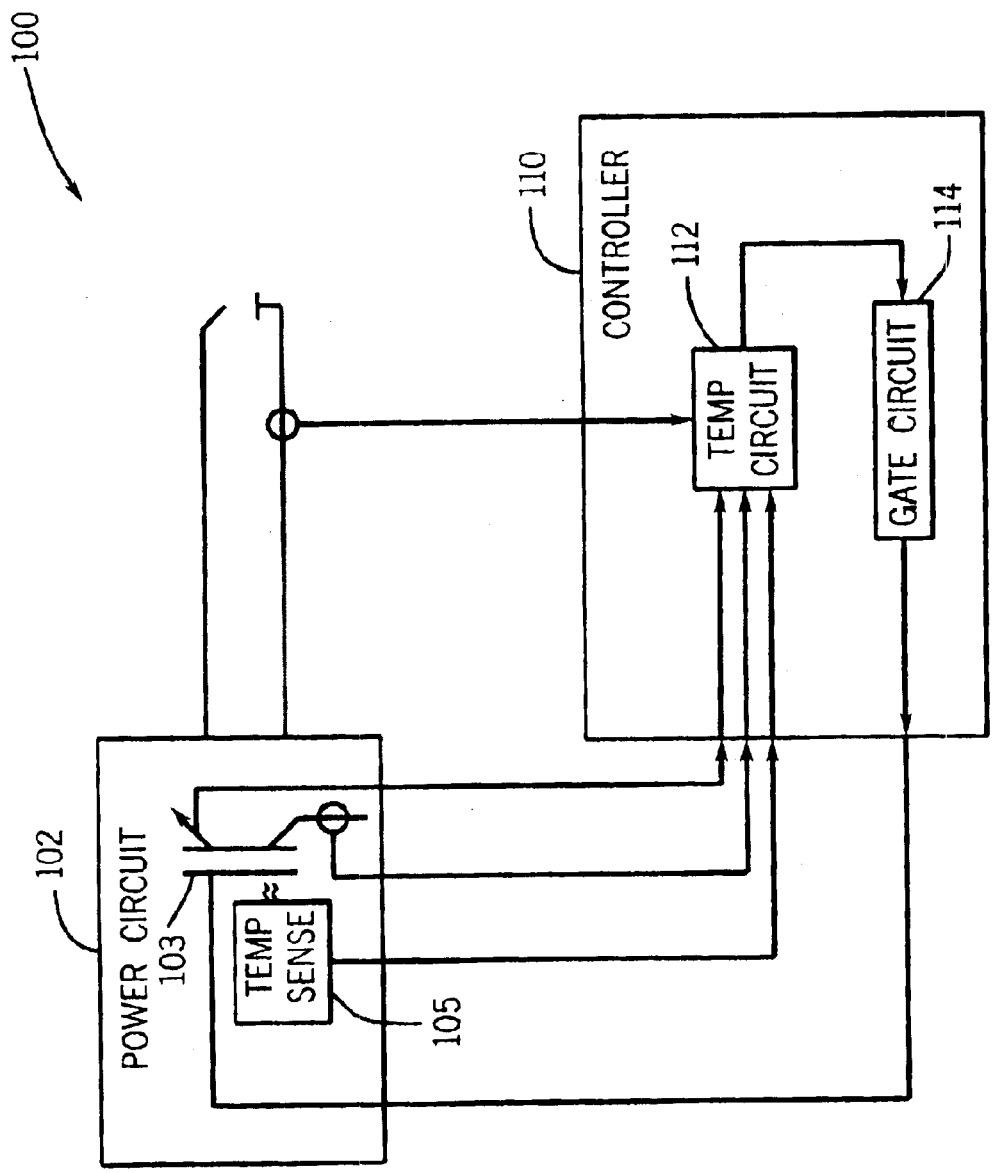
FIG. 1 is block diagram of a welding-type power supply in accordance with the present invention.
Figure 2:
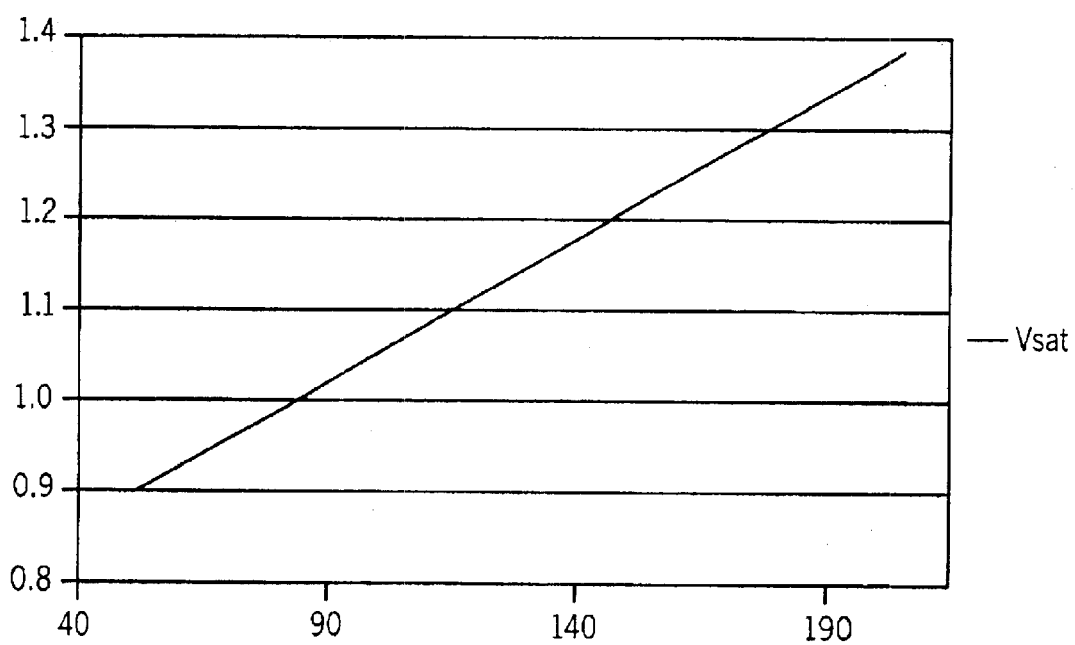
FIG. 2 is a graph of Vsat over the output current range.
Figure 3:
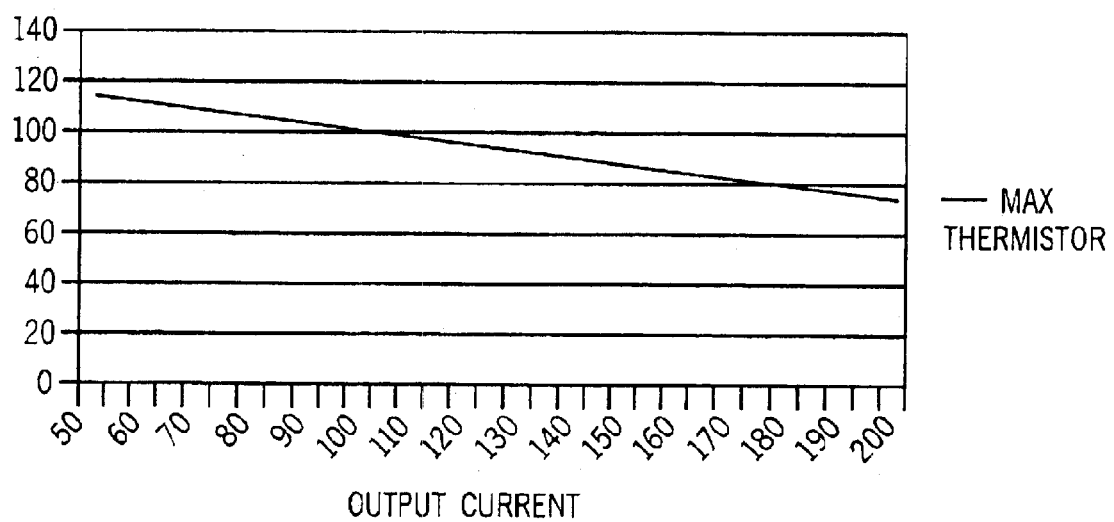
FIG. 3 is a graph of sensed temperature that produces the optimal junction temperature, over the output current range.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding-type power supply and a particular set of temperature data, it should be understood at the outset that the invention can also be implemented with other welding-type power supplies, and with other temperature data.

Generally, the present invention provides for a welding-type power supply with a thermal management scheme that accounts for differences between the sensed temperature and the junction temperature over a range of outputs.

Specifically, Vsat was obtained (it was measured but may be estimated or treated as a constant) for a number of selected currents over the output range. Each selected current was multiplied by Vsat for that selected current, to obtain the power for each of the selected currents. Using the switch manufacturer's thermal impedance and the calculated switch power, a temperature drop from the junction to the switch casing was then calculated, for each of the selected currents. Another embodiment includes compensation for switching losses, which are greater at higher frequencies.

An additional temperature drop occurs between the sensor (a thermal resistor in the preferred embodiment) and the switch casing. Combining the additional drop from the casing to the sensor with the calculated drop from the junction to the casing, gives the temperature drop from the junction to the sensor at the selected currents.

Given the temperature drop, it is easy to determine the maximum sensed temperature that will result in the optimal junction temperature for the currents selected. This data may be used to prepare a look-up table or create a formula that provides the sensed temperature at which the junction temperature is at a maximum, for any current, not just the selected currents. The table and/or formula include only the temperature differences, and the threshold is elsewhere calculated, in one alternative.

Turning now to FIG. 1, a block diagram of a welding-type power supply 100 in accordance with the present invention includes a power circuit 100 and a controller 110. Welding-type power supply, as used herein, refers to a power supply that provides welding, plasma or heating power. Power circuit, as used herein, includes any device capable of supplying welding-type power, including switches, power elements, and ancillary circuitry. Circuit, as used herein, includes analog and/or digital components, software or hardware, including microprocessors or DSP's or a portion thereof, and discrete circuit elements. Controller, as used herein, includes digital and analog circuitry, discrete or integrated circuitry, microprocessors, DSPs, etc., and software, hardware or firmware, located on one or more boards, used to control a device such as a power supply.

Power circuit 102 includes at least one switch 103, and may be any power supply, including, for example, inverter based or converter based. Switch 103 is a Powerex® IGBT in the preferred embodiment. Feedback leads for the current through switch 103 and the voltage across switch 103 are shown, although the current feedback is obtained from the machine output using an LEM in the preferred embodiment. Moreover, the current may be obtained from the machine output, and/or assumed to be identical for all switches in various embodiments. Switch, as used herein, includes any device that is used to control power and/or current flow, and has a control input.

The preferred embodiment uses an inverter based power supply with a plurality of IGBT switches. Current feedback (without voltage feedback) is used to determine the maximum temperature in the preferred embodiment. The current is sensed and a threshold temperature for the sensed temperature associated with the sensed current is used. The data used to calculate the threshold includes current and voltage data.

A temperature sense circuit 105 may be part of, or merely mounted near, power circuit 102. It is preferably disposed near the casing for at least one of switches 103 to more accurately sense the temperature of the casing. The temperature sensor includes a thermistor in the preferred embodiment, but may include anything that provides a signal indicative of a sensed temperature.

The temperature sensor doesn't directly sense either the junction temperature or the casing temperature. Rather it senses the temperature near the case. Thus, the sensor senses a temperature produced by the switch, but not the temperature of the switch. Temperature produced by the switch, as used herein, includes temperatures resulting from the heat produced by the switch, and need not be at the switch junction or on the casing. Temperature of the switch, as used herein, includes the switch junction temperature.

The LEM used to sense the current is part of a switch feedback circuit (a switch feedback circuit is any circuit that feedbacks a switch operating parameter, even when the parameter is sensed elsewhere, such as the current at the output). A second lead provides voltage feedback in some embodiments. The feedback circuit provides operating parameters of the switches, such as current or voltage, as well the product or other functions thereof, such as derivatives, integrals, etc. The feedback circuit may also include scaling and buffer elements.

Controller 110 includes a temperature circuit 112 that receives signals indicative of one or more switch operating parameters and the sensed temperature. Temperature circuit 112 determines if the switch temperature is too high by comparing the sensed temperature to a corrected threshold. If it is too high controller 110 reduces the output of the power circuit (reduces includes turning off or lowering to a level at which the switch or switches produces less heat).

More specifically, in the preferred embodiment temperature circuit 112 is at least partially digital and includes a look-up table (i.e., a collection of data associated with values of an index). The switch current feedback signal is used to look-up a corrected temperature threshold associated with that current. Thus, the operating parameter—current in the preferred embodiment—is the index to the look-up table. Alternatively, the temperature correction (i.e., the difference between the junction temperature and the sensed temperature) can be stored as data in the look-up table. Corrected threshold, as used herein, is the sensed temperature which corresponds to the maximum or safe junction temperature at a given operating parameter.

The data in the look-up table was derived using current and voltage of the switch, in the preferred embodiment. In other words, the current and voltage were used to determine the difference between the junction temperature and the sensed temperature, at a number of currents over the current range. While the temperature corrections are based on switch current and switch voltage in the preferred embodiment, it may be based on current alone, or other operating parameters in other embodiments.

The corrected temperatures from data including switch current and switch voltage are shown in the table below. Columns 2–5 show, for the currents of column 1, switch voltage, switch power, the temperature of the switch case for a junction temperature of 130° C. (which is the maximum temperature in the preferred embodiment), and the sensed temperature that corresponds to a junction temperature of 130° C. Column 4 is obtained using the thermal impedance for the switch, and calculating a temperature correction based on the power (current and voltage), assuming an ambient temperature of 40° C. Thus, column 4 includes temperature corrections or temperature adjust values (the difference between the number in column 4 and 130). Column 5 includes a correction for the difference between the case and the sensor, which is 8° C. in the preferred embodiment (and depends on the sensor location, air flow, etc.). Thus, column 5 also includes temperature corrections or temperature adjust values (the difference between the number in column 5 and 130). As used herein, data derived from temperature correction values or temperature adjust values (such as the temperatures of columns 4 and 5) is said to include temperature correction values or temperature adjust values.

| Current | Vsat | Power | Max Tc@40 of case for Tjunc = 130° C. | Max Temp for Thermistor for Tjunc = 130 |
|---|---|---|---|---|
| 50 | 0.9 | 45 | 122.8 | 114.8 |
| 55 | 0.9175 | 50.4625 | 121.926 | 113.926 |
| 60 | 0.935 | 56.1 | 121.024 | 113.024 |
| 65 | 0.9525 | 61.9125 | 120.094 | 112.094 |
| 70 | 0.97 | 67.9 | 119.136 | 111.136 |
| 75 | 0.9875 | 74.0625 | 118.15 | 110.15 |
| 80 | 1.005 | 80.4 | 117.136 | 109.136 |
| 85 | 1.0225 | 86.9125 | 116.094 | 108.094 |
| 90 | 1.04 | 93.6 | 115.024 | 107.024 |
| 95 | 1.0575 | 100.4625 | 113.926 | 105.926 |
| 100 | 1.075 | 107.5 | 112.8 | 104.8 |
| 105 | 1.09 | 114.45 | 111.688 | 103.688 |
| 110 | 1.105 | 121.55 | 110.552 | 102.552 |
| 115 | 1.12 | 128.8 | 109.392 | 101.392 |
| 120 | 1.135 | 136.2 | 108.208 | 100.208 |
| 125 | 1.15 | 143.75 | 107 | 99 |
| 130 | 1.165 | 151.45 | 105.768 | 97.768 |
| 135 | 1.18 | 159.3 | 104.512 | 96.512 |
| 140 | 1.195 | 167.3 | 103.232 | 95.232 |
| 145 | 1.21 | 175.45 | 101.928 | 93.928 |
| 150 | 1.225 | 183.75 | 100.6 | 92.6 |
| 155 | 1.24 | 192.2 | 99.248 | 91.248 |
| 160 | 1.255 | 200.8 | 97.872 | 89.872 |
| 165 | 1.27 | 209.55 | 96.472 | 88.472 |
| 170 | 1.285 | 218.45 | 95.048 | 87.048 |
| 175 | 1.3 | 227.5 | 93.6 | 85.6 |
| 180 | 1.315 | 236.7 | 92.128 | 84.128 |
| 185 | 1.33 | 246.05 | 90.632 | 82.632 |
| 190 | 1.345 | 255.55 | 89.112 | 81.112 |
| 195 | 1.36 | 265.2 | 87.568 | 79.568 |
| 200 | 1.375 | 275 | 86 | 78 |
| | | | m | b |
| | | | −0.24533 | 128.7525 |

Formula = 128 − (Ioutput/4)
Therm Boundary = 85 to 115

The table also includes a linear equation derived from the data, as well as the maximum and minimum sensed temperatures over the entire current range. The equation is used to create the data for the lookup table.

A calculation circuit (i.e. a circuit that implements a formula) is used instead of the look-up table in one embodiment. In this embodiment the formula is implemented using a circuit (digital or analog) that has as an input the switch feedback parameter (such as current) and as an output a signal indicative of the maximum temperature for that circuit (or the correction for the threshold).

The output of the look-up table (or calculation circuit) is provided to a gate circuit 114, which provides gating signals to the gate drive (control input) of switch 103. Gate drive circuit 114 includes other inputs, such as the portion of the controller that provides the user selected output. The output of temperature circuit 112 is used to adjust the gating signals to turn off or reduce the output power.

Numerous modifications may be made to the present invention which still fall within the intended scope hereof. Thus, it should be apparent that there has been provided in accordance with the present invention a method and apparatus for a welding-type power supple that has thermal management that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is :

1. A welding-type power supply comprising:
    a power circuit, including at least one switch having a control input;
    a temperature sense circuit, disposed to sense a temperature produced by the at least one switch, and having a temperature output indicative of the sensed temperature;
    a switch feedback circuit, disposed to sense at least one switch operating parameter, and having a switch feedback output signal responsive thereto; and
    a controller, including a temperature circuit having as an input, and responsive thereto, the switch feedback output and the temperature output, and providing a control output, wherein the control input of the at least one switch is responsive to the control output.

2. The welding-type power supply of claim 1, wherein the at east one switch operating parameter includes current or a function thereof.

3. The welding-type power supply of claim 2, wherein the at least one switch operating parameter further includes voltage or a function thereof.

4. The welding-type power supply of claim 2, wherein the temperature circuit includes a look-up table having as an index the switch current, and wherein data in the look-up table includes temperature adjust values.

5. The welding-type power supply of claim 4, wherein the data includes temperature adjust values based on switch current and switch voltage.

6. The welding-type power supply of claim 1, wherein the at least one switch operating parameter includes voltage or a function thereof.

7. The welding-type power supply of claim 1, wherein the temperature circuit includes a look-up table having as an index the at least one switch parameter, and wherein data in the look-up table includes temperature adjust values.

8. The welding-type power supply of claim 1, wherein the temperature circuit includes a calculation circuit having as an input the switch feedback output, and having as an output a temperature that includes a temperature adjust value.

9. The welding-type power supply of claim 8, wherein the calculation output is a function of at least one of a switch current and a switch voltage.

10. The welding-type power supply of claim 1, wherein the temperature feedback circuit includes a thermal resistor.

11. The welding-type power supply of claim 1, wherein the feedback means includes a thermal resistor.

12. The welding-type power supply of claim 1, wherein the temperature circuit further includes a temperature correction circuit having as an input, and responsive thereto, the switch feedback output.

13. A method of providing welding-type power comprising:
    controlling a power circuit having at least one switch with a control input;
    sensing a temperature produced by the at least one switch;
    sensing at least one switch operating parameter, and providing a switch feedback output signal responsive thereto; and
    reducing the output of the power circuit in the event the sensed temperature exceeds a corrected threshold, wherein the corrected threshold is responsive to the operating parameter.

14. The method of claim 13, wherein the at least one switch operating parameter includes current or a function thereof.

15. The method of claim 14, wherein the at least one switch operating parameter further includes voltage or a function thereof.

16. The method of claim 14, further including retrieving a temperature that includes a temperature correction based on the operating parameter.

17. The method of claim 16, wherein the temperature correction is from data including a switch current and a switch voltage.

18. The method of claim 13, wherein the at least one switch operating parameter includes voltage or a function thereof.

19. The method of claim 13, further including retrieving a temperature that includes a temperature correction based on the operating parameter.

20. The method of claim 13, further comprising calculating a temperature that includes a temperature adjust value in response to the operating parameter.

21. The method of claim 20, wherein the calculation is a function of at least one of a switch current and a switch voltage.

22. The method of claim 20, wherein the calculation is a function of a switch current and a switch voltage.

23. A welding-type power supply comprising:
    power means for providing output power, including at least one switch means for switching in response to a control input;
    temperature sense means for sensing a temperature produced by the at least one switch means and for providing a temperature output indicative of the sensed temperature;
    feedback sans for sensing at least one switch operating parameter and for providing switch feedback output signal responsive thereto; and
    control means for controlling the power means, including means for receiving the switch feedback output signal and the temperature output, and for controlling the power means in response thereto, wherein the output of the power means is limited when the temperature produced exceeds a threshold responsive to the operating parameter.

24. The welding-type power supply of claim 23, wherein the feedback means includes means for sensing current.

25. The welding-type power supply of claim 24, wherein the feedback means further includes means for sensing voltage.

26. The welding-type power supply of claim 23, wherein the feedback means includes means for sensing voltage.

27. The welding-type power supply of claim 23, wherein the control means includes means for looking-up a temperature that includes a temperature adjust value in response to the switch feedback output signal.

28. The welding-type power supply of claim 23, wherein the control means includes means for calculating a temperature that includes a temperature adjust value in response to the switch feedback output signal.

29. A welding-type power supply for providing welding-type power comprising:
    means for controlling a power circuit having at least one switch with a control input;
    means for sensing a temperature produced by the at least one switch, connected to the at least one switch;
    means for sensing at least one switch operating parameter, and having a switch feedback output signal responsive thereto, connected to the at least one switch; and
    means for reducing the output of the power circuit in the event the sensed temperature exceeds a corrected threshold.

30. The welding-type power supply of claim 29, wherein the at least one switch operating parameter includes current or a function thereof.

31. The welding-type power supply of claim 30, wherein the at least one switch operating parameter further includes voltage or a function thereof.

32. The welding-type power supply of claim 30, further including means for retrieving a temperature that includes a temperature correction based on the operating parameter.

33. The welding-type power supply of claim 29, wherein the at least one switch operating parameter includes voltage or a function thereof.

34. The welding-type power supply of claim 29, further includes means for retrieving a temperature that includes a temperature correction based on the operating parameter.

35. The welding-type power supply of claim 29, further comprising means for calculating a temperature that includes a temperature adjust value in response to the operating parameter.

36. The welding-type power supply of claim 35, wherein the means for calculating includes means for calculating as a function of at least one of a switch current and a witch voltage.

37. The welding-type power supply of claim 29, wherein the temperature feedback circuit includes a thermal resistor.

* * * * *